3,278,596
PROCESS FOR PREPARATION OF
N-(SALICYL)HYDRAZIDES
Laurence A. Pursglove, Midland, Mich., assignor to The Dow Chemical Company, Midland, Mich., a corporation of Delaware
No Drawing. Filed Sept. 1, 1961, Ser. No. 135,423
1 Claim. (Cl. 260—558)

The present invention is directed to a novel process for the preparation of certain 2-salicylhydrazides of benzoic acid.

The compounds of the present invention correspond to the formula

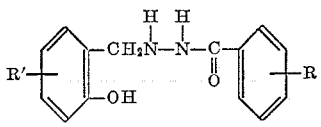

wherein each of R and R' is independently a member of the group consisting of hydrogen, lower alkyl, bromine, chlorine, and nitro. When either of R and R' is used to represent hydrogen it is to be understood that such hydrogen is a normal component of the benzenoid nucleus. A lower alkyl group is here defined as an alkyl group being of 1 to 4, inclusive, carbon atoms.

In the novel method of the present invention, the compounds are prepared by causing a reaction between an α-chloro-o-tolylbenzoate corresponding to the formula

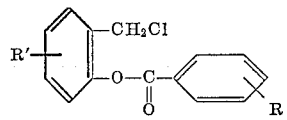

with hydrazine hydrate in the presence of a hydrogen chloride acceptor. In the resulting reaction, hydrogen from the hydrazine hydrate combines with the chlorine of the chloromethyl group characteristic of the chlorotolylbenzoate compound, and liberates the elements of hydrogen chloride; the benzoyl moiety of the esterifying benzoate group exchanges position with a second hydrogen of the said hydrazine compound whereby there arises the hydroxyl group characteristic of the salicyl moiety, and the hydrazide structure of the compounds of the present invention. These aspects of the reaction appear to take place as a single step reaction. The resulting compounds are of relatively low solubility in water, and of various solubilities in organic solvents; in general they are soluble in lower alkanols. In isolated form, they are crystalline solids. The compounds are useful as blowing agents in foamed plastics, as chelating agents for metals, as binders in high-energy solid fuels, as curing agents in the hardening of epoxy resins, and as intermediates to be used in the preparation of biologically active derivative compounds.

The reactants may be combined in any order and in any relative proportion in the presence or absence of solvent and over a wide range of temperatures to cause a reaction and obtain products of the present invention in appreciable quantities. The reactants react in equimolecular proportions. By the selection of preferred conditions, yields of the present products are substantially increased.

Free hydrazine may be used as a reactant in the present preparation but its hydrate is more easily handled and is a preferred form.

In an advantageous method of carrying out the process of the present invention, the hydrazine hydrate compound, hydrogen chloride acceptor, and inert liquid reaction medium are mixed together and warmed to a temperature in a preferred reaction temperature range. Thereafter, the α-chloro-o-tolylbenzoate compound is added slowly, portionwise or continuously, over a period of time to avoid undue violence of the resulting reaction. Upon completion of the combining of reactants, the mixture is maintained at a preferred temperature range for a period of time to carry the reaction to completion. Thereafter, the desired product is recovered in any of various methods which will be known to skilled chemists. In one such method, liquid reaction medium is vaporized and removed. When hydrogen chloride acceptor is an alkali metal compound, the solid residue remaining after removal of reaction medium may be extracted with a lower alkanol whereby to elute the desired product leaving by-product alkali metal chloride and unreacted hydrogen chloride acceptor in the residue which may be discarded. Alternatively, the products may be separated by fractional distillation under subatmospheric pressure, whereby to remove volatile substances and obtain, in the distillate, a relatively pure product. Also, fractional crystallization and like purification procedures may be employed.

The process of the present invention goes forward slowly with preparation of desired product at any temperature from substantially lower than room temperature to temperatures so high as to cause thermal damage to the reactants or product. However, the lower extreme temperatures are regarded as disadvantageous since the reaction goes forward relatively very slowly; the higher reaction temperatures are regarded as relatively disadvantageous because of the likelihood of damage to reactants or product. Thus, while temperatures from approximately 0° C. to about 190° C. are fully operative, a preferred temperature range is from 50° to 100°C.

Production of the desired products of the present invention begins immediately when the necessary reactants are brought into contact. Thus, no given duration of reaction time is regarded as critical; when it is desired to obtain good yields in proportion to employed amounts of starting material, in the preferred temperature range, reaction times generally will be of 1 to 100 hours duration. The reaction may be carried out under any pressure near to atmospheric pressure without any visible effect from the pressure. The use of greater or lesser pressures is largely without effect upon the course of the reaction or identity of products.

The reactants may be employed together in any desirable proportion or quantities. However, when it is desired to produce the present products efficiently and in good yield without undue waste of starting materials or preparation of unwanted by-products, about one molecular proportion of hydrazine hydrate per molecular proportion of chlorotolyl benzoate compound should be employed and the employed hydrogen chloride acceptor should be in an amount sufficient to accept at least one mole of hydrogen chloride. The acceptor may be an excess of the hydrazine, or may be an organic or inorganic basic material such as an amine or alkali metal hydroxide or carbonate. The inert reaction medium may be alcohol, dimethyl formamide, dioxane, or other organic medium, or preferably, water.

The manner of using the process and making the products of the present invention will be evident to those skilled in the art from the following descriptions of specific embodiments of the process and the compositions resulting therefrom, although the present invention is limited only by the claim and not by these specific embodiments, which are illustrative only.

SPECIFIC EMBODIMENT 1

*Method of synthesizing benzoic acid 2-salicylhydrazide and product resulting therefrom*

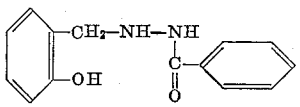

To 100 milliliters water were added 21 grams (0.25 mole) sodium bicarbonate and 20 grams (0.4 mole) hydrazine hydrate. The resulting mixture was thoroughly stirred and warmed to 50° C. Thereupon, α-chloro-o-tolylbenzoate at room temperature was added slowly, in small portions, over a 40-minute period, for a total addition of 49.2 grams (0.2 mole) of the said benzoate reactant.

The resulting reaction mixture was then heated to and maintained at a temperature of 75° C., with stirring, for about 20 hours. Thereafter, the temperature was permited to cool to room temperature, whereupon an aqueous layer separated from a coherent product layer. The aqueous layer was decanted and the resulting cohesive solid was washed with 100 milliliters carbon tetrachloride to obtain 37 grams of product, a 76 percent yield. The product was reprecipitated from butanol to obtain a cohesive to resinous product melting at 174–185° C. Infrared analysis confirmed the identity of the product and indicated it to be more than 95 percent pure by weight.

The product is useful to "cure," that is, to induce hardening of diglycidyl ether epoxy resin precursors to obtain epoxy resins. In such use, a small, non-critical amount such as from 1 to 25 percent by weight of resin precursor is added to the precursor and heated therewith, whereupon it causes the precursor to harden, and obtain a useful resin. Similar results are obtained from other epoxy resin precursors.

SPECIFIC EMBODIMENT 2

*4-nitrobenzoic acid 2-(3-nitrosalicyl)hydrazide*

The product of the present specific embodiment is prepared in procedures essentially similar to the foregoing except that the starting benzoate is α-chloro-4-nitro-o-tolyl-4-nitrobenzoate. Reaction temperature is about 50° C. As a result of these operations there is obtained a nitrobenzoic acid 2-(3-nitrosalicyl)hydrazide product having a molecular weight of 332.28 and being of the formula

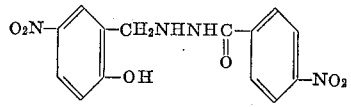

Yields from the process of the present invention generally vary between 50 and 95 percent of theoretically perfect yields based upon the amount of whichever starting material is present in the limiting amount.

In similar preparations, employment of the following starting material prepares the stated following products:

From hydrazine hydrate using pyridine as both hydrogen chloride acceptor and liquid reaction medium, by reaction with o-nitro-α-clhoro-o-tolylbenzoate (melting at 88°–91° C.) at a reaction temperature of 110° C., there is obtained a benzoic acid 2-(3-nitrosalicyl) hydrazide.

From hydrazine hydrate with sodium bicarbonate as hydrogen chloride acceptor and by reaction with α,4-dichloro-o-tolylbenzoate (a waxy solid product melting in the range of 30°–55° C.) in water as reaction medium and at 250° C., there is prepared a benzoic acid 2-(m-chlorosalicyl)hydrazide.

From the reaction of 2-chloromethyl-4-methylphenyl 4-tertiarybutyl benzoate there is obtained a 4-tertiary-butyl-benzoic acid 2-(5-methylsalicyl)hydrazide.

Employing 6-tertiarybutyl-α-chloro-o-tolyl o-toluate there is obtained an o-toluic acid 2-(3-tertiarybutylsalicyl)hydrazide.

From hydrazine hydrate and 5-nitro-α-chloro-o-tolyl 3-bromobenzoate in water as reaction medium and using sodium carbonate as hydrogen chloride acceptor, there is obtained a 3-bromobenzoic acid 2-(4-nitrosalicyl)hydrazide.

From the reaction of α,4-dichloro-o-tolyl 3-chlorobenzoate and hydrazine in water and with sodium bicarbonate as hydrogen chloride acceptor at the boiling temperature of the resulting solution (approximately 100° C.) there is obtained 3-chlorobenzoic acid 2-(5-chlorosalicyl)hydrazide.

The α-chloro-o-tolylbenzoate starting reactants to be employed according to the present invention are prepared by reacting one molecular proportion of chlorine with one molecular proportion of an o-tolylbenzoate of which the structure is the same as the desired starting reactant structure except that the methyl group characteristic of a tolyl compound is not chlorinated. The chlorination is carried out in the presence of phosphorus trichloride or phosphorus pentachloride and at a temperature in the range of 20° C. to 150° C. and preferably in the presence of light as stimulus to the desired chlorination reaction.

As employed in the instant specification and claim, the radical name "salicyl" refers to the nucleus having the structure

whereof the benzenoid nucleus may be variously substituted.

The compounds of the present invention are all useful as epoxy curing agents in the manner described in Specific Embodiment 1.

I claim:

A method of preparing a compound corresponding to the formula

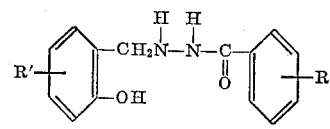

which comprises the step of causing a reaction between a compound corresponding to the formula

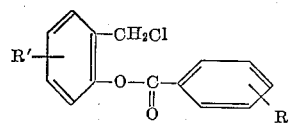

with hydrazine in the presence of a hydrogen chloride acceptor, wherein each of R and R' is independently a member of the group consisting of hydrogen, bromine, chlorine, and nitro, it being understood that when either of R and R' represents hydrogen, such hydrogen is a normal component of the benzenoid nucleus.

References Cited by the Examiner

Beilstein's Handbuch Organischen Chemie, vol. 9, (original work, 4th ed.), pp. 351, 467, 495, (1926).

(Other references on following page)

Grammaticakis: Bull Soc. Chim. France, pp. 659–69, p. 659 relied on (1955).

Offe et al.: Z. Naturforsch, vol. 7B, pp. 446–462, pp. 449–455 relied on, (1952).

Sacconi: Jour. Am. Chem. Soc., vol. 74 pp. 4503–4505 (1952).

Sacconi: Jour. Am. Chem. Soc., vol. 75 pp. 5434–5435, (1953).

Yale et al.: Jour. Am. Chem. Soc., vol. 75, pp. 1933–1942 (1953).

WALTER A. MODANCE, *Primary Examiner.*

IRVING MARCUS, *Examiner.*

J. W. ADAMS, R. L. PRICE, N. TROUSOF,
*Assistant Examiners.*